2. Sheets. Sheet. 1.

N. Millington,

Dividing Engine.

No. 4,262.

Reissued Feb. 14. 1871.

1. The fastening-pins or their equivalents for li iting the movement of the dies and retaining them the chase, in combination with a series of separa dies and chase in their proper positions to stamp t several numbers on a square, so that they can all moved together to change from one square to a other, and that each die may be struck and be ma to operate separately, as set forth.

2. A series of chases hinged to a common suppo and containing each a series of separate dies, whi may be successively brought into position for use, su stantially as and for the purposes herein specified.

3. The combination of the revolving chase-wh W with the lateral-moving anvil A, by which the r ative position of the square to be stamped and t required chase is so regulated that the line of t square to receive the impression is brought under t chase containing the desired figures, substantially herein set forth.

Fig. 1

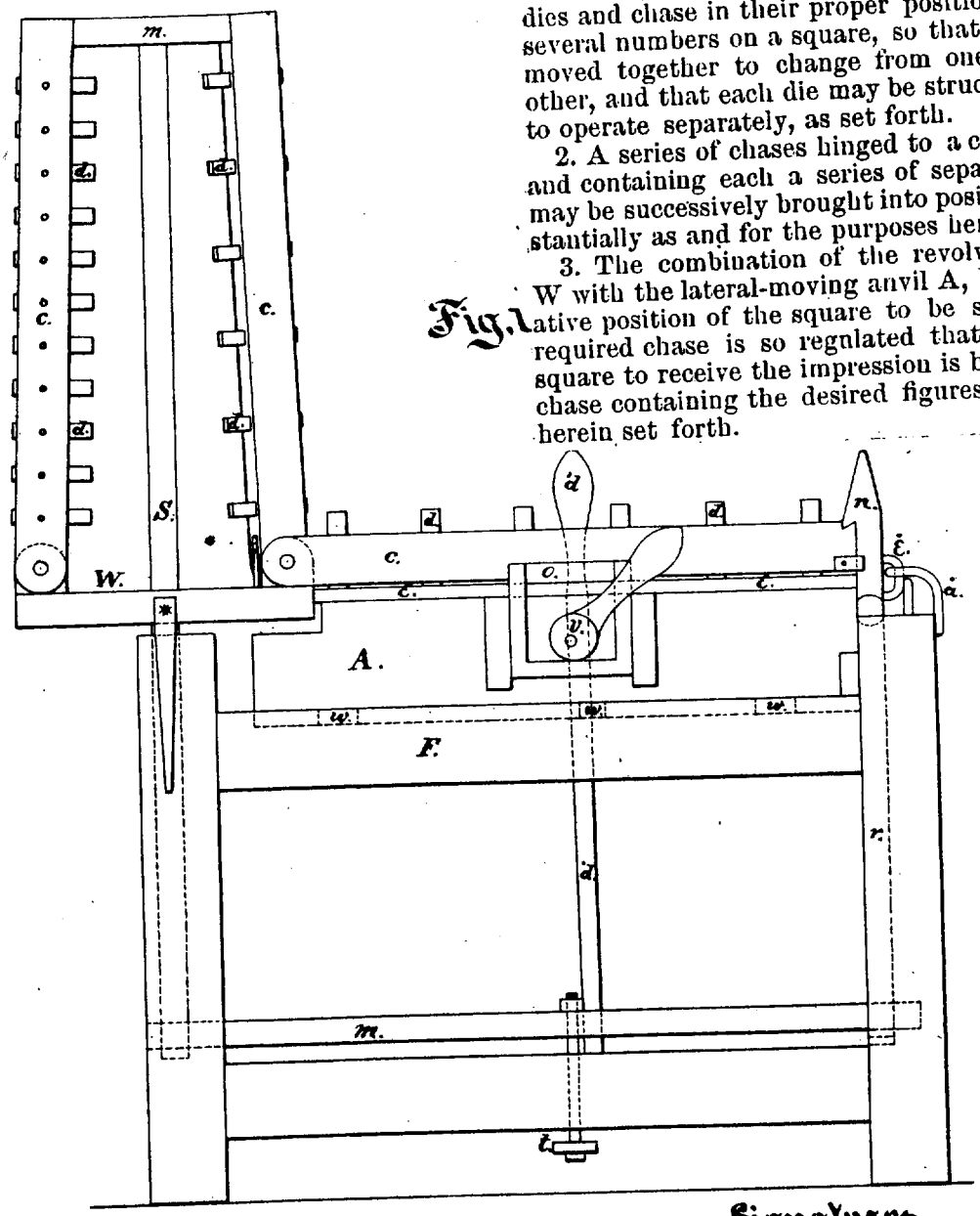

Witnesses,

A. Hoermann.

C. C. Livings

Signatures,

Eagle Square Company by their attorney, J. B. Nelson

United States Patent Office.

NORMAN MILLINGTON, OF SHAFTSBURY, VERMONT, ASSIGNOR, BY MESNE ASSIGNMENTS, TO THE EAGLE SQUARE COMPANY.

Letters Patent No. 10,136, dated October 18, 1583; extended seven years; reissue No. 4,262, dated February 14, 1871.

IMPROVEMENT IN MACHINES FOR FIGURING CARPENTERS' SQUARES.

The Schedule referred to in these Letters Patent and making part of the same.

*To all whom it may concern:*

Be it known that NORMAN MILLINGTON and DENNIS J. GEORGE, of Shaftsbury, in the county of Bennington and State of Vermont, invented new and useful Improvements in the Method of Figuring or Stamping the Figures onto Carpenters' Squares, Rules, &c., for which Letters Patent of the United States issued to them, dated October 18, 1853, and which have since, for cause shown, been extended, and, by certain deeds of assignment duly recorded, been conveyed to The Eagle Square Company, of South Shaftsbury, in the county of Bennington and State of Vermont, and being advised by counsel that the said Letters Patent are partially inoperative and invalid by reason of a defective specification, and having petitioned to surrender the same and receive reissued Letters Patent on an amended specification, we hereby submit the following as such amended specification, the accompanying drawing making part of the same.

The best means of carrying out the invention consist in providing the requisite number of chases set with the proper dies or figures for the several lines of figures to be stamped on the different sides of the bar and tongues of the squares, and placing them perpendicularly on the rim of the wheel, to which they are connected by a joint at the bottom, in the proper order for stamping, and then placing the square in a horizontal position on the face of an anvil arranged to move laterally on ways, so as to bring the end of the line or space to be figured directly opposite to the end of the chase, which is turned down upon the face of the line or space for which the line of figures was arranged, where it is confined by clasps, and the dies or figures standing perpendicularly are struck in quick succession by a hammer, giving a perfect impression, when the chase is raised to its perpendicular position and the next in order brought down onto the next space on the square, which is brought to the proper position by the lateral movement of the anvil.

To enable others skilled in the art to make and use the said improvement, we will proceed to give a more particular description of its construction and operation, reference being had to the accompanying drawing, viz:

No. 1 showing a front elevation of the machine.

No. 2, plan showing the machine as seen from above, except the chases.

F, a strong frame of wood or iron, to which the machine is attached.

A, the anvil, on the face of which the squares are confined for stamping, is arranged to move laterally on ways by the agency of the lever *d'* at the back of the frame, and also to bring by said movement the end of the squares directly opposite to the proper line of figures in the chase, which stands, when not in immediate use, in a perpendicular position.

W, the wheel, having tenons on the upper side of the rim to form joints, with the mortises at the lower ends of the chases equal in number to all the lines of figures on the squares, may be turned to adjust the chases to the position of the square to be stamped on the anvil.

Drawing No. 1 shows the position of but three chases, two of which stand leaning back against the little wheel at top, and the other is turned onto the square on the face of the anvil.

At No. 2 are shown the tenons to which the chases are hung, numbering from 1 to 19.

*c*, the chases, equal in number to all the lines of figures to be stamped on square, each containing a row of figures or dies arranged to give the desired impression on one of the spaces on the square, are attached by joints to, and stand perpendicularly, on the rim of the wheel, so as to be out of the way when not in immediate use; but being brought round, each in turn, opposite to the end of the square on the face of the anvil, the chase is turned down onto the space for which it is designed, the impression is made by striking each die with a hammer.

*d*, the dies or figures, are set loosely in mortises crosswise, extending quite through the chases, from which they are prevented from falling by pins passing through holes in the chase and die. The hole in the die may be enlarged, or in the form of a slot, to allow the die a limited play. These dies are so arranged in the different chases as to give the proper impression on each of the several spaces on the bar and tongue of the square.

S, the shaft to the wheel W, to which it is firmly attached, stands in a perpendicular position, and holds the rim of the wheel a little above the level of the face of the anvil by a spiral or other spring under the bottom end, and is made to press upon the end of the chase attached to the wheel firmly onto the square, by the action of the treadle, which brings down the other end, both of which are connected to the balance-bar *m'*.

O, the clasp, by which the square is confined to the anvil, or liberated by the action of the cam *v* turned by a lever.

E, the square, under a chase, and confined to the anvil by the clasp O in the balance-bar, one end of which is slipped onto the bottom of the shaft S and confined there by a pin, and the other end is connected to the catch *n* by the rod *r* dotted onto the post, which bar, being in a horizontal position, is brought to bear on both ends of the chase by the agency of the treadle *t*.

*t*, the treadle, hung to the lower rail at the back side of the frame, is suspended in the center to the balance-bar by a rod, so that pressure on the treadle will act with equal force on each end of the chase, and confine the square during the process of stamping.

*w*, the ways, on which the anvil is moved back and forth laterally, by the action of the lever *d'* at the back side of the frame, to adjust the square and bring the space to be stamped into a right line with the chase while in an upright position.

*v*, eccentric cam, moved by a lever and acting on the clasp O.

*n*, the catch, by which the end of the chase is confined in the right position on the square, having a joint near the top of the frame connecting it by a rod to the end of the balance-bar; but when the pressure is taken off the treadle the catch rises up and is drawn back by the spring *a'*, liberating the chase and square.

*a'*, the spring, to draw back the catch *n*, connected to a staple in the catch.

E', a staple or cam on the outside of the catch, resting against a cleat or roller when the catch is drawn down to bring it forward and catch upon and confine the chase till liberatad by raising the treadle.

*d'*, lever, hung to the bottom rail on the back side of the frame, and connected above the upper back rail by a rod to the anvil, by the action of which lever the anvil is moved back and forth laterally and adjusted to the position of the chase.

*m*, the little wheel at the top of the shaft, against which the chases rest when standing in an upright position.

*, a spring with a catch, to confine the wheel in a proper place.

What is claimed as the invention of the said NORMAN MILLINGTON and DENNIS J. GEORGE is—

1. The fastening-pins or their equivalents for limiting the movement of the dies and retaining them in the chase, in combination with a series of separate dies and chase in their proper positions to stamp the several numbers on a square, so that they can all be moved together to change from one square to another, and that each die may be struck and be made to operate separately, as set forth.

2. A series of chases hinged to a common support, and containing each a series of separate dies, which may be successively brought into position for use, substantially as and for the purposes herein specified.

3. The combination of the revolving chase-wheel W with the lateral-moving anvil A, by which the relative position of the square to be stamped and the required chase is so regulated that the line of the square to receive the impression is brought under the chase containing the desired figures, substantially as herein set forth.

In testimony whereof we have hereunto set our names in presence of two subscribing witnesses.

THE EAGLE SQUARE CO.,
A. B. GARDNER, *Prest.*

Witnesses to the signature of A. B. GARDNER:
WM. P. MATTISON,
HIRAM R. HASWELL.

W. P. MATTISON, *Secty.*
MILO PIERCE.
N. R. DOUGLASS.

Witnesses to the signatures of WM. P. MATTISON, *Secty.*, MILO PIERCE, and N. R. DOUGLASS:
J. B. EMERTON,
A. A. COLLINS.

Witnesses: NORMAN MILLINGTON.
OLIVER GREEN,
C. M. FISK.